United States Patent [19]

Kobayashi

[11] Patent Number: 5,016,883
[45] Date of Patent: May 21, 1991

[54] GOLF CLUB HEADS AND FABRICATION PROCESS THEREOF

[75] Inventor: Masashi Kobayashi, Kawaguchi, Japan

[73] Assignee: Maruman Golf Kabushikikaisha, Tokyo, Japan

[21] Appl. No.: 397,552

[22] Filed: Aug. 23, 1989

[30] Foreign Application Priority Data

Aug. 26, 1988 [JP] Japan .................. 63-210426

[51] Int. Cl.$^5$ .............................. A63B 53/04
[52] U.S. Cl. .................. 273/167 R; 273/173
[58] Field of Search .................. 273/167–175, 273/DIG. 33, 77 R

[56] References Cited

U.S. PATENT DOCUMENTS

| | | | |
|---|---|---|---|
| 3,218,072 | 11/1965 | Burr | 273/168 X |
| 3,975,023 | 8/1976 | Inamori | 273/173 |
| 4,545,580 | 10/1985 | Tomita et al. | 273/167 R |
| 4,714,577 | 12/1987 | Nagamoto et al. | 273/167 H X |
| 4,793,616 | 12/1988 | Fernandez | 273/167 H |
| 4,803,023 | 2/1989 | Enomoto et al. | 273/167 H X |
| 4,824,116 | 4/1989 | Nagamoto et al. | 273/171 |
| 4,848,747 | 7/1989 | Fujimura | 273/77 A |
| 4,852,880 | 8/1989 | Kobayashi | 273/169 |

FOREIGN PATENT DOCUMENTS

| | | |
|---|---|---|
| 51-22755 | 6/1976 | Japan . |
| 53-25457 | 3/1978 | Japan . |
| 56-36521 | 8/1981 | Japan . |
| 60-66766 | 4/1985 | Japan .................. 273/173 |
| 60-66767 | 4/1985 | Japan .................. 273/173 |
| 60-198170 | 10/1985 | Japan . |

Primary Examiner—Edward M. Coven
Assistant Examiner—Sebastiano Passaniti
Attorney, Agent, or Firm—Armstrong, Nikaido, Marmelstein, Kubovcik & Murray

[57] ABSTRACT

A golf club head with a composite body which in turn has a ceramic sponge body defining a number of pores therein and a filler selected from the group consisting of metals, synthetic resins, fiber-reinforced metals and fiber-reinforced resins and impregnated into the pores. The golf club head is fabricated by forming a foamed resin head substantially conforming in configurations and dimensions with the composite body, impregnating the foamed resin head with a ceramic slurry, followed by sintering to form a ceramic sponge body defining pores therein, filling the pores of the ceramic sponge body with a wax, covering the ceramic sponge body with a mold-forming refractory material, applying a heat treatment to remove the wax and to sinter the refractory material, and then casting the filler into the pores.

8 Claims, 3 Drawing Sheets

FIG. 7
FIG. 8
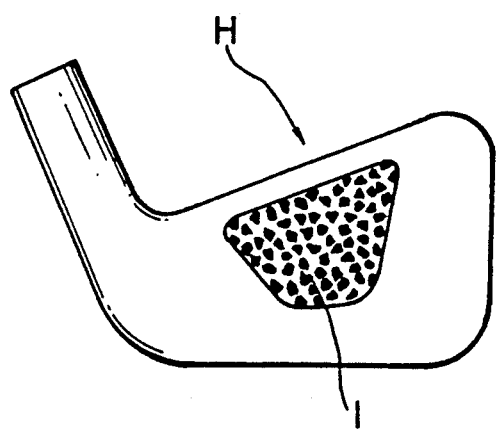
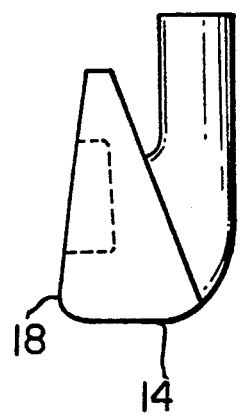
FIG. 9
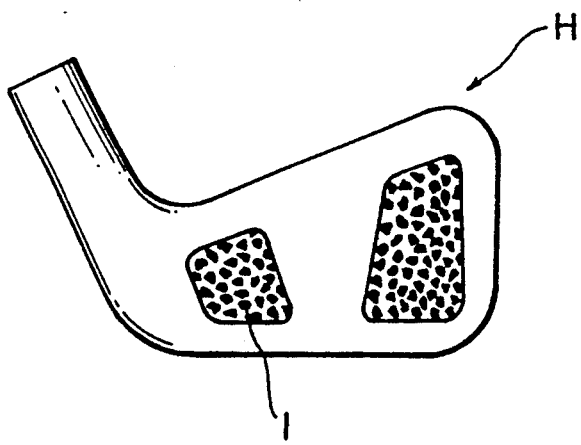

GOLF CLUB HEADS AND FABRICATION PROCESS THEREOF

FIELD OF THE INVENTION

The present invention relates to golf club heads. More specifically, this invention relates to golf club heads which are made wholly or partly of composite bodies formed by filling porous or ceramic sponge bodies with a metal, fiber-reinforced metal, resin or fiber-reinforced resin and which have a low density, i.e., a light weight and are excellent in abrasion resistance, strength, etc. This invention is also concerned with a process for the fabrication of such golf club heads.

BACKGROUND OF THE INVENTION

There is currently considerable growth in the development of golf club heads of improved performance, particularly with the benefit of lighter weight. Analyzing this move from the facet of development of materials, the following golf club heads have been proposed. However, none of them have fully satisfactory performance.

(i) Japanese Utility Model Application Laid-Open No. 22755/1976 discloses a golf club head having a face plate, which is made of an alumina ceramic material containing at least 90% $Al_2O_3$, applied to the face with a view toward achieving a head weight reduction and also providing increased resilience against the ball. The ball however tends to slip when struck, because the face is a smooth surface formed singly of the alumina ceramic material mentioned above. The above golf club head is accompanied by another drawback in that the face plate is prone to separation from the face of the head because they are merely bonded face to face two-dimensionally.

(ii) Japanese Patent Application Laid-Open No. 198170/1985 discloses a golf club head with a casting of Al or an Al alloy in a foamed metal body (metal sponge body) composed principally of Ni, for the ball-striking face of the head, to reduce weight and improve hardness, resilience, abrasion resistance and machinability. The casting is however a foamed metal body and hence has a small effect for the reduction of weight. Furthermore, the foamed metal body forming the ball-striking face and a member forming other portions of the head are made of similar metal materials, so that there is little difference in hardness between them. It is impossible therefore to spin the ball when striking it. In other words, the above golf club head cannot give any large traction to the ball, thereby making it difficult to impart the desired flying characteristics to the ball when striking it.

(iii) Japanese Utility Model Application Laid-Open No. 25457/1978 discloses a golf club head which is composed of a sponge metal impregnated with a synthetic resin. Because of the use of the sponge metal, the head has a large specific gravity. Therefore, this approach does not contribute much to achieving a lighter head. It is hence impossible to fabricate the large head desirable to facilitate striking the ball.

It is therefore an object of the present invention to avoid the drawbacks of the above-discussed golf club heads, especially the conventional club heads' need to reduce the weight thereof.

It is another object of this invention to provide a golf club head which is lightweight, yet strong and abrasive resistant by having the golf club head composed of a foamed porous ceramic body (hereinafter, referred to as "ceramic sponge body") as a base and a metal, fiber-reinforced metal (FRM), resin or fiber-reinforced resin (FRP) filled in the ceramic sponge, instead of employing a conventional metal sponge; namely, a sponge metal produced by adding foaming agent to a molten metal.

SUMMARY OF THE INVENTION

The aforementioned and other objects of the present invention are accomplished by providing a golf club head having a front face, a sole face and a rear face. The golf club head includes a composite body including a porous ceramic body having a plurality of pores formed therein; and a filler. The filler can be metals, synthetic resins, fiber-reinforced metals, fiber-reinforced resins or the like. Further, the filler is impregnated into the pores.

BRIEF DESCRIPTION OF THE DRAWINGS

FIGS. 3 and 4 illustrate a carbon fiber reinforced plastic (CFRP) head according to a third embodiment of this invention, in which FIG. 3 is a perspective view of the CFRP head having an insert formed of a composite ceramic sponge body and FIG. 4 is a perspective view of the insert formed of the composite ceramic sponge body;

FIGS. 5 and 6 show a golf club head according to a fourth embodiment of this invention, in which FIG. 5 is a rear view of the golf club head while FIG. 6 is a front view of the golf club head as viewed from the toe side;

FIGS. 7 and 8 depict a golf club head according to a fifth embodiment of this invention, in which FIG. 7 is a rear view of the golf club head while FIG. 8 is a front view of the golf club head as viewed from the toe side; and FIG. 9 is a rear view of a golf club head according to a sixth embodiment of this invention.

DETAILED DESCRIPTION OF THE INVENTION

This invention will hereinafter be described in detail.

The principal feature of this invention resides in the use of a composite body of a ceramic sponge body and a metal, fiber-reinforced metal (FRM), synthetic resin or fiber-reinforced resin (FRP), which has been obtained by using the ceramic sponge body as a base and impregnating the metal, fiber-reinforced metal, synthetic resin or fiber-reinforced resin into pores of the ceramic sponge body to produce a golf club head either in whole or part, thereby making it possible to provide a golf club head having not only light weight but also various other improvements.

Now, processes of this invention for the fabrication of golf club heads by using composite ceramic sponge bodies of the above-described sort, to which this invention is also directed, will be described on the basis of the accompanying drawings.

Figure 1:
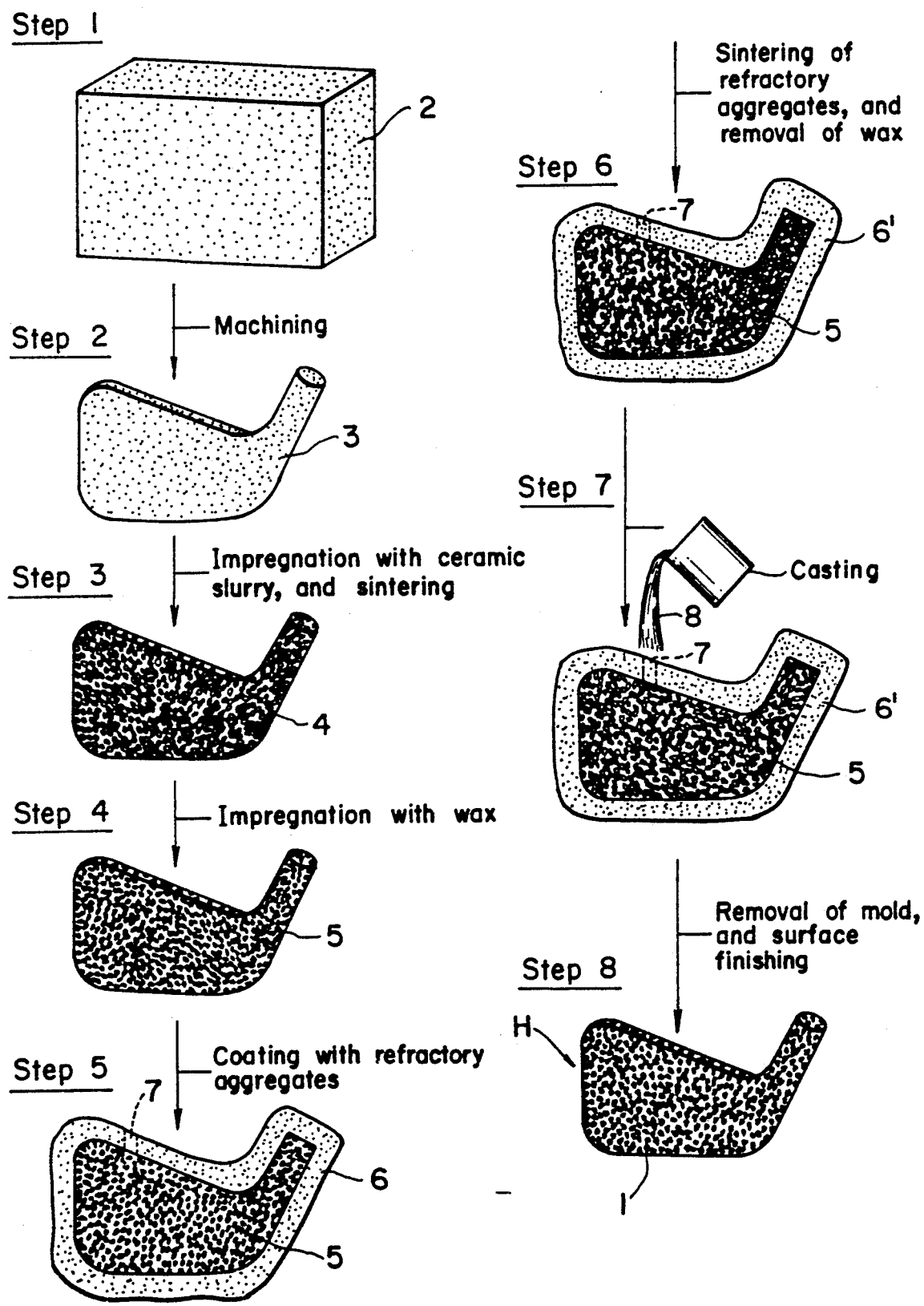
FIG. 1 is a process diagram for forming a golf club head according to a first embodiment of this invention, which is formed in its entirety with a composite ceramic sponge body.

FIG. 1 illustrates diagrammatically a fabrication process where an iron head according to a first embodiment of this invention is formed wholly of a composite ceramic sponge body which is in turn composed of a ceramic sponge body and a metal or the like impregnated into pores of the sponge body.

(1) First, a resin foam 2 such as polyurethane foam is provided (Step 1).

(2) The foam 2 is machined, namely, cut into the shape of a desired iron head to obtain a foamed resin head 3 (Step 2).

(3) The foamed resin head 3 is next impregnated with a ceramic slurry, followed by sintering to obtain a ceramic sponge body 4 having the same shape as the desired iron head (Step 3).

The step of impregnating the foamed resin head 3 with the ceramic slurry and then sintering the same into the ceramic sponge body 4 is known per se in the art. This technique is employed, for example, when a heat-resistant ceramic filter suitable for use in removing impurities from a molten metal is produced using a resin foam. An alumina slurry can be used as the ceramic slurry and the sintering can be conducted at about 2,000° C.

(4) The ceramic sponge body 4, which has been prepared in the preceding step and conforms in configurations and dimensions with the desired iron head, is then impregnated with a wax to obtain a wax-impregnated ceramic body 5 (Step 4).

The fourth and subsequent steps are carried out using a precision casting technique such as the well-known lost-wax process. Namely, a casting is fabricated using as a mold the ceramic sponge body which conforms in configurations and dimensions with the desired iron head.

Since the mold is porous, the mold is impregnated with the wax in Step 4 to smoothen its entire surface so that a mold-forming refractory material such as molding sand would not penetrate into the pores of the ceramic sponge body 4 in the next step.

(5) Nest, the wax-impregnated ceramic body 5 is covered with the mold-forming refractory material, whereby the wax-impregnated ceramic body 5 is covered with a layer 6 of the refractory material (Step 5).

As the refractory material, refractory aggregates commonly employed in casting can be used. Specifically, it is possible to use a mixture of molding sand and a silicate binder which serves to bind the molding sand. Needless to say, a runner 7 must be formed here through the layer 6 of the refractory material in order to facilitate casting of a molten metal in a subsequent step.

(6) The wax-impregnated ceramic body 5 covered with the layer 6 of the refractory material is subjected to a heat treatment, whereby the layer of the refractory material is sintered into a refractory layer 6' and dewaxing is achieved, namely, the wax is caused to melt out or to burn off (Step 6).

(7) Next, a molten metal 8 is impregnated into the pores of the ceramic sponge body 5 (Step 7).

Stainless steel, brass, aluminum, titanium or the like can be used as the metal. This invention permits not only casting of such a metal but also casting of a fiber-reinforced metal to reinforce such a metal with fibers. The preferred choice for fiber-reinforced metal is silicon carbide whiskers and aluminum in combination.

(8) After cooling, the refractory layer 6' is removed. The surface of the ceramic sponge body 4 with the metal cast therein is then ground and polished, namely, is subjected to surface finishing to finish an iron head H consisting of a composite ceramic sponge body 1 (Step 8).

In addition to the casting process described above, the present invention can also be practiced by placing a head or a head member such as a face insert or sole plate, which consists of the ceramic sponge body of the desired configurations and dimensions obtained by Step 1 through Step 3, in a mold of a plastic molding machine and filling pores of the ceramic sponge body with a molten synthetic resin to form the ceramic sponge body and resin into a composite body. An epoxy resin, ABS resin, a polycarbonate resin or the like can be used a the resin.

In this invention, it is possible to use not only the above synthetic resin but also a combination of the synthetic resin and reinforcing fibers such as carbon fibers (CF), glass fibers (GF), wholly aromatic polyamide fibers or boron fibers.

ADVANTAGES OF THE INVENTION

The golf club head according to this invention uses a composite ceramic sponge body, which is composed of a ceramic sponge body and a metal or the like, as an entire or partial component of the head. The composite ceramic sponge body has a light weight and is excellent in abrasion resistance, strength, etc., so that it can exhibit the following advantageous effects.

(i) Making use of the light weight characteristic of the composite ceramic sponge body, it is possible to fabricate a large head which permits easy striking of small balls.

(ii) By exposing the composite ceramic sponge body a face, the face can be imparted with improved abrasion and impact resistance. In this case, because of a difference in hardness between the composite ceramic sponge body and a base member of the head, the face undergoes minute concave-convex deformations upon striking a ball so that spins can be easily imparted to the ball. This allows to strike balls of various flying characteristics.

(iii) A low gravity-center head can be fabricated by providing the composite ceramic sponge body in an upper part of a head. This allows to bring the point of gravity center into registration with the striking point, whereby the energy of impact can be transmitted to a ball without loss.

(iv) Since the composite ceramic sponge body is formed from the ceramic sponge body in which uniform pores are formed, the density distribution can be controlled evenly, in other words, heads having little weight variations can be fabricated. In contrast, a sponge metal contains non-uniform pores due to varied degrees of foaming because the sponge metal has been prepared by adding a foaming agent to a molten metal. Accordingly, resulting heads have large weight variations.

(v) Since the composite ceramic sponge body and the head base member can be firmly united together upon formation of the head base member, a safe head free of dangerous separation can be fabricated.

ADDITIONAL EMBODIMENTS OF THE INVENTION

Additional embodiments of this invention will hereinafter be described in detail. It should however be borne in mind that this invention is not necessarily limited to the above and following examples. In the following examples, fabrication processes will not be described in detail because they have already been described above in detail with respect to the iron head according to a first embodiment of this invention.

EXAMPLE 1

Figure 2:
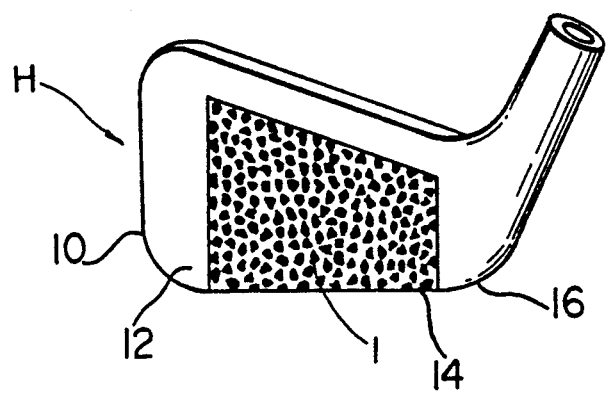
FIG. 2 is perspective view of a golf club head according to a second embodiment of this invention, in which a composite ceramic sponge body is exposed for part of the face of the golf club head.

A second embodiment of this invention is depicted in FIG. 2, in which a composite ceramic sponge body 1 is exposed at a part of the face of an iron head H. As illustrated in, for example, FIG. 2, the iron head H specifically has a toe portion 10, a face portion 12, a sole portion 14, and a heel portion 16. Also, the iron head H has a rear face portion 18, as illustrated in, for example, FIG. 8. The golf club head according to the second embodiment can be fabricated in the following manner. A ceramic sponge body is machined into a trapezoidal shape in advance, therefore forming a face insert. It is important that bosses for holding refractory aggregates are provided on the face insert at this stage. Next, the face insert is impregnated with a wax and the resultant face insert is covered with the refractory aggregates until the bosses are buried within the refractory aggregates. Heating is then applied to remove the wax, so that pores are formed inside the ceramic sponge body while the ceramic sponge body is covered by the refractory aggregates. Thereafter, a metal such as stainless steel is cast into the ceramic sponge body, the refractory aggregates are removed, and the resultant ceramic sponge body with the metal cast therein is subjected to surface finishing. The composite ceramic sponge body 1 thus formed is fit and secured in a corresponding recess of the iron head H, thereby providing a head whose face features improved abrasion and impact resistance.

EXAMPLE 2

Figure 3:
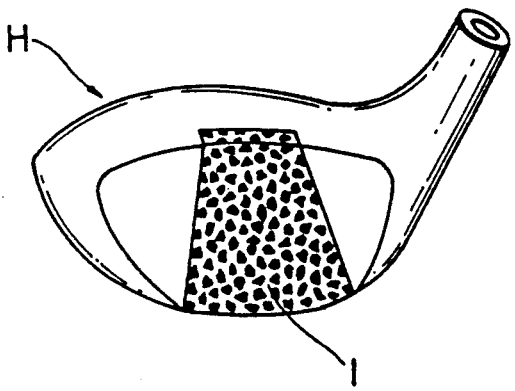
Figure 4:
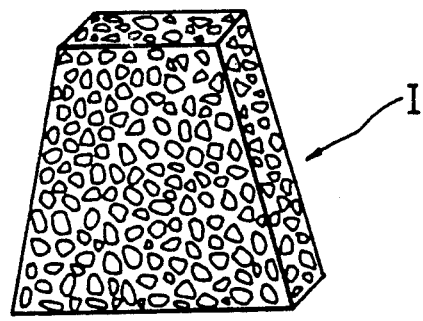

A third embodiment of this invention is illustrated in FIGS. 3–4, in which a composite ceramic sponge body 1 is provided in the face of a head H made of CFRP (carbon fiber reinforced resin). The golf club head according to the third embodiment can be fabricated in the following manner. A ceramic sponge body is formed into a trapezoidal shape in advance to prepare an insert plate I (see FIG. 4). The insert plate I is placed in a mold of a plastic molding machine. Then, CFRP is charged into the mold by injection (or compression) molding to form an integral unit of a head main body made of CFRP and the insert plate I made of the ceramic sponge body. This process allows the synthetic resin, which makes up the head main body, to impregnate into pores of the ceramic sponge body, so that the head main body and insert plate are firmly united together.

EXAMPLE 3

Figure 5:
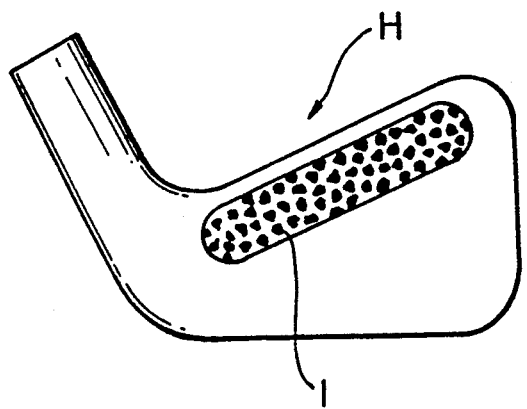
Figure 6:
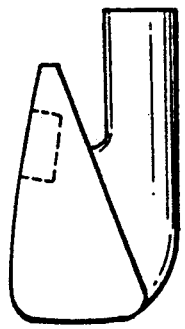

A fourth embodiment of this invention is depicted in FIGS. 5–6, in which a plate-like composite ceramic sponge body 1 is provided in an upper portion of the rear face of an iron head H. The composite ceramic sponge body 1 extends between the toe and the heel. Because of the light weight of the composite ceramic sponge body 1, the point of gravity center of the iron head H can be moved toward the sole. In other words, the point of gravity center can be brought into registration with the striking point for golf balls. It is therefore possible to ideally transmit the energy of impact to the ball. The composite ceramic sponge body 1 can also be provided in an upper part of the face.

EXAMPLE 4

A fifth embodiment of this invention is illustrated in FIGS. 7–8, in which a composite ceramic sponge body 1 is provided in a central part of the rear face of an iron head H. In this embodiment, the density is higher at the toe and heel of the iron head H compared to its central part, so that the iron head H has a higher moment of inertia. Accordingly, the iron head H has good controllability as to the flying direction of a ball. The composite ceramic sponge body 1 can also be provided in a central part of the face.

EXAMPLE 5

A sixth embodiment of this invention is shown in FIG. 9, in which a composite ceramic sponge body 1 is divided into two pieces in the rear face of an iron head H, one being on the toe side and the other on the heel side. In this embodiment, a central portion (ball-striking portion) of the head has a relatively higher density so that the iron head H is provided with strong resilience. Needless to say, the composite ceramic sponge body 1 can be provided as two separate pieces in the face.

I claim:

1. A golf club head having a front face, a sole face and a rear face, said golf club head comprising a composite body, wherein said composite body includes:
   a porous ceramic body having a plurality of pores formed therein; and
   a filler selected from the group consisting of metals, synthetic resins, fiber-reinforced metals and fiber-reinforced resins, said filler being impregnated into said pores.

2. The golf club head as claimed in claim 1, wherein the head is formed wholly of the composite body.

3. The golf club head as claimed in claim 1, wherein at least a portion of said front face, sole and rear face of said head is formed of said composite body.

4. The golf club head as claimed in claim 1, wherein a central portion of the rear face of the head is formed of the composite body.

5. The golf club head as claimed in claim 1, wherein an upper portion of the head is formed of said composite body, said upper portion extending from a toe portion of said rear face of said head to a heel portion of said rear face.

6. The golf club head as claimed in claim 1, wherein the composite body is inserted as a face insert in the head.

7. The golf club head as claimed in claim 1, wherein the ceramic sponge body is made of alumina and the filler is selected from stainless steel, brass, aluminum, titanium, a combination of silicon carbide whiskers and aluminum, an epoxy resin, ABS resin, a polycarbonate resin, or a combination of a synthetic resin and reinforcing fibers selected from carbon fibers, glass fibers, wholly-aromatic polyamide fibers or boron fibers.

8. A golf club head having a front face, a sole face and a rear face, said golf club head comprising a porous ceramic body having a plurality of pores impregnated with a compound selected from the group consisting of metals, synthetic resins, fiber-reinforced metals and fiber reinforced resins to form a low-density composite club head body.

* * * * *